United States Patent [19]
Akahira

[11] Patent Number: 5,491,003
[45] Date of Patent: Feb. 13, 1996

[54] METHOD FOR MANUFACTURING AN OPTICAL RECORDING FILM COMPOSED OF A METAL AND AN OXIDE WHICH CAN UNDERGO AN OXIDATION-REDUCTION REACTION UPON EXPOSURE TO A LASER BEAM

[75] Inventor: Nobuo Akahira, Yawata, Japan

[73] Assignee: Matsushita Electric Industrial Co., Ltd., Osaka, Japan

[21] Appl. No.: 131,933

[22] Filed: Oct. 5, 1993

Related U.S. Application Data

[60] Continuation of Ser. No. 863,037, Apr. 6, 1992, abandoned, which is a division of Ser. No. 666,661, Mar. 8, 1991, abandoned.

[30] Foreign Application Priority Data

Mar. 8, 1990 [JP] Japan .................................. 2-057170

[51] Int. Cl.⁶ .......................... C23C 14/24; C23C 14/34
[52] U.S. Cl. .................. 427/255.3; 427/162; 427/166; 427/255.7; 204/192.26; 346/135.1; 369/288; 430/321; 430/945
[58] Field of Search ...................... 427/162, 166, 427/250, 251, 255.3, 255.7, 555, 556; 204/192.26, 192.27; 346/135.5; 369/288; 430/945, 321

[56] References Cited

U.S. PATENT DOCUMENTS

| | | | |
|---|---|---|---|
| 4,091,171 | 5/1978 | Ohta et al. | 428/539 |
| 4,640,860 | 2/1987 | Ritchie | 428/143 |
| 4,651,172 | 3/1987 | Watanabe | 346/135.1 |
| 4,902,584 | 2/1990 | Uchiyama et al. | 428/694 |
| 4,916,048 | 4/1990 | Yamada et al. | 430/523 |
| 5,080,947 | 1/1992 | Yamada et al. | 428/64 |

FOREIGN PATENT DOCUMENTS 62-217438  9/1987  Japan .

*Primary Examiner*—Terry J. Owens
*Attorney, Agent, or Firm*—Wenderoth, Lind & Ponack

[57] ABSTRACT

An optical recording medium having a recording film composed of a mixture of a metal and an oxide or alternating layers of a metal and an oxide is formed by vacuum evaporation or sputtering from separate metal and oxide sources without inducing an oxidation-reduction reaction between the metal and oxide. The oxide has a standard enthalpy of formation which is higher than that of an oxide obtained by oxidizing the metal. Information is recorded by irradiating portions of the film with a laser beam so as to cause an exothermic oxidation-reduction reaction between the metal and oxide, thereby causing an optically detectible change in the optical constant of the film at the portions irradiated.

8 Claims, 4 Drawing Sheets

METHOD FOR MANUFACTURING AN OPTICAL RECORDING FILM COMPOSED OF A METAL AND AN OXIDE WHICH CAN UNDERGO AN OXIDATION-REDUCTION REACTION UPON EXPOSURE TO A LASER BEAM

This application is a continuation of now abandoned application, Ser. No. 07/863,037, abandoned, filed Apr. 6, 1992, which is a division of now abandoned application, Ser. No. 07/666,661, filed Mar. 8, 1991.

BACKGROUND OF THE INVENTION

1. Field of the Invention

The present invention relates to an optical information recording medium capable of recording information densely on an optically recording thin film formed on a substrate with an optical or thermal energy and optically reproducing the information.

2. Description of Related Art

It is possible to make a small laser spot having a diameter of the order of the wave length of the laser when the laser is focused by a lens system. Therefore a laser source in a low output power can make a laser beam in a high energy density per unit area. The laser beam consequently can change a material state at a small area and also can read the changed state at the small area of a material. An optical information recording medium can use the above change by the laser beam and to record and reproduce the information. Hereinafter the optical information recording medium is referred to as an optical recording medium or simply a medium.

The optical recording medium in a basic structure is characterized by a substrate provided with a flat surface having a recording film applied thereto. The recording film should vary in the state, i.e. exhibit some optically detectable change, upon irradiating the laser beam. The following method usually executes the recording and reproducing of the information by using the optical recording medium. The optical recording medium is moved rotatably or straightly by a suitable means, for example, a motor, and is irradiated by a convergent laser beam. During the above process the concentrated laser beam should be usually controlled to focus on the recording surface. The recording surface is heated by absorbing the laser energy. When the laser is in a power higher than a predetermined laser power threshold value, the recording film changes in the state and records information. The threshold value depends on the characteristic of the recording film, the thermal characteristic of the substrate and a moving speed of the optical recording medium relative to the laser beam spot. When a laser beam spot having an output power lower than the threshold value is irradiated on the recording film, a part having the recorded information exhibits optical characteristics such as the intensity of a transmitted light, the intensity of a reflected light and their polarization angles different from those of a part having no recorded information. These differences make it possible to read and reproduce the recorded information. During a reading process or a reproducing process, the laser beam spot is usually subjected to a tracking control so as to follow exactly a line of the parts changed in the state by the recorded information prepared by an irradiation of laser. For an execution of the tracking control, the substrate has a tracking guide such as an uneven groove formed thereon. It has long been known to execute the recording and reproducing of information on the optical recording medium under such a tracking guide.

An example of the optical recording medium is an optical recording disk. The optical recording disk is already used in the market as a video picture file, a documentation file and a data file of a computer. An optical recording medium in a card form or a tape form is proposed for a practical use.

It is desirable to achieve, as a recording film, a material or a structure which shows a large change in the optical characteristic under irradiation of a laser of a small power.

It has been known that the optical recording medium can be composed of a metal film made from Bi or Te metal film, an alloy film including Bi or Te as a main constituent or a compound film including Te. The film has holes made by melting or evaporation to record information upon receiving a laser beam. The reflected beams or the transmitted beams at the part having holes and the part having no holes are different from each other in the phase and are canceled or diffracted by the interference between them and differ consequently in the amount of the reflected beam or the transmitted beam. The optical recording medium in such characteristic can be composed of Se-Te system (disclosed in Japanese Patent Publication (unexamined) 59-35356) and Te-C system (disclosed in Japanese Patent Publication (examined) 58-71195) or possibly an organic pigment.

In addition, there has been known another optical recording medium called a phase transition type which shows an optical change due to a change in the crystal structure without changing the shape. A phase transition in the crystal structure has been known to have two types, one is a phase transition between an amorphous state and a crystal state, the other, a phase transition between two crystal states. As to the optical recording medium of the phase transition type, there have been known thin films of amorphous chalcogen compound and oxide containing $Te-TeO_2$ as a main component (see, for example, Japanese Patent Publication (examined) No. 54-3725 and U.S. Pat. No. 3,971,874). Also, thin film containing $Te-TeO_2-Pd$ as a main component (see, for example, Japanese Patent Publication (unexamined) No. 61-68296 and U.S. Pat. No. 4,624,914) has been known. The signal recording is carried out by changing either the extinction coefficient or the refractive index of the thin film by irradiating the same with a laser beam. The signal reproduction can be carried out by detecting a variation in the amount of transmitted laser or reflected laser which is caused by a variation in the amplitude of transmitted laser or reflected laser at the part having the information recorded. Further the disclosure has reported an optical recording medium having two stacked layers of a layer absorbing a laser and a layer changing an optical characteristic (Japanese Patent Publication (examined) 1-14039).

There is known another type of an optical recording medium which is capable of only reproducing information signals. The read only medium optically reproduces information recorded on a replica disk made from a resin material, which has information signals recorded in a form of uneven pits previously formed thereon. The replica disk is manufactured in such a way that the resin substrate is stamped with a stamper made of metal such as nickel to form the uneven pits and is provided with a laser reflecting layer of aluminum (Al) or gold (Au) applied to the surface of the resin disk by a vacuum evaporation method. This method is capable of manufacturing the resin disks in a large scale. The read only medium is characterized by a high reflectivity due to the reflecting layer and a high level of a reproducing signal. The high reflectivity would be able to make it easy to treat the read only medium with a focus tracking control. The optical read only medium such as an optical video disk (VLP), an audio digital disk (CD: compact disk) or a read only memory (ROM) of a computer which is called CD-ROM is now commercially available.

A disclosure has reported a read and write recording medium compatible with the reproducing only medium. There is a disclosure (Japanese Patent Publication (examined) 2-132656) which reports a recording medium which comprises a resin substrate having an organic pigment layer and a metal reflecting layer formed thereon to achieve a high reflectivity. An information signal can be recorded on the recording medium and reproduced by an equipment designed for a read only medium.

Among the optical recording mediums, an optical recording medium of ablative type can produce the reflected laser of a high level but has a disadvantage that the pit can not be easily formed in an accurate shape and size, and the noise generated during the reproducing process is in a rather high level. In addition, it is difficult to apply a contact protecting layer to the recording medium of ablative type. The recording medium of ablative type must have such a complicated structure which is called air-sandwich structure which has an air gap between the protecting layer and the recording medium, and results in a difficulty in the manufacturing and accordingly in a high cost.

An optical recording medium of phase transition type does not show a change in the shape and consequently is simple in the structure thereof resulting in ease and a low cost in the manufacturing process. However, the optical recording medium of phase transition type has small optical constants and consequently a low reflectance. In order to achieve a high reflectance of the optical recording medium of phase transition type, it is necessary to form a complicated multi-layered structure designated according to an optical design technique and an additional metal reflecting layer.

In connection with a conventional optical recording medium, it can be said that the optical recording medium having a high reflectance exhibits a poor laser absorption and consequently a poor recording sensitivity. Particularly the write once type of optical recording medium accompanied with a metal reflection film, and the optical recording medium of phase transition type include a recording film having a high thermal conductivity and require a high power of the laser for recording information. The requirement of the high laser power prevents these optical recording mediums from a practical application.

An optical recording medium comprising an organic dye has a high recording sensitivity because of its low threshold temperature of a transition and a low thermal conductivity, and consequently can record information with a practical power size of laser in spite of a low absorption of laser. On the other hand, the optical recording medium comprising an organic pigment has a small optical constant and consequently a low reflectance. In order to improve the reflectance, an additional metal reflecting layer is required and results in a complicated structure of the optical recording medium. Further there is another problem that the optical recording medium comprising an organic pigment has a low aging stability and particularly a low resistance to a degradation caused by an irradiation of ultraviolet ray.

SUMMARY OF THE INVENTION

The object of the present invention is therefore to provide a high sensitivity which solves these problems mentioned above.

Another object of the present invention is to provide an optical recording medium which has a high reflectance as well as a simple structure having a high environmental stability and is easily compatible with a reproducing only medium for use in an information reproducing apparatus.

A further object of the present invention is to provide a method for manufacturing an optical recording medium mentioned above.

A further object of the present invention is to provide a method of recording optically information on the optical recording medium mentioned above.

The present invention has been developed with a view to substantially solving the above described disadvantages and has for its essential object to provide an improved optical recording medium and a method of manufacturing the optical recording medium mentioned above.

In order to achieve the aforementioned objective, an optical recording medium according to the present invention comprises a substrate having an optical recording film applied thereto. The optical recording film is composed of a mixture or an integrated layers of at least two materials which react with each other under exothermic reaction upon receiving an irradiation of a laser beam. The two materials comprise a metal and an oxide which has a standard enthalpy of formation higher than that of the oxide obtained by oxidation of the metal.

The enthalpy of formation is alternatively named as a heat of formation and will be explained with an example of an oxide for easy understanding. The enthalpy of formation of an oxide is a reaction heat by which the oxide is formed from a metal and oxygen. Usually the heat of formation is expressed in energy per mol. The enthalpy of formation at one atmosphere is named as standard enthalpy or standard heat of formation. In connection with an oxide, a standard enthalpy of formation is a negative value and is in a lower level with a higher absolute numeral. A metal having the corresponding oxide in a lower level of enthalpy of formation is more easily oxidized.

When the optical recording medium is irradiated with a laser, the optical recording film is heated to a higher temperature whereby the oxide included in the optical recording film is reduced into a metal while the metal included in the optical recording film is accordingly oxidized into an oxide. As a result, the optical recording medium changes in the optical constant and can be detected optically at the reduced portion. The optical recording medium in the configuration mentioned above contains a metal as a main constituent and accordingly has a high reflectivity ratio. In the configuration mentioned above, the reduction reaction of an oxide by a metal is of an exothermal reaction and is promoted by the heat from the exothermal reaction when the reduction reaction starts even at a small energy of laser. In such way, the reduction reaction expands from an initial point to adjacent area by a heat diffusion and sufficiently forms a variation in the phase of the recording film.

An irradiation of laser to the optical recording medium induces an exothermic reaction and heats up the optical recording medium to a high temperature at the point receiving the laser. During the reduction reaction, the actual heating energy is a sum of the energy of irradiated laser and the heat energy induced by the exothermal reaction. Therefore a small power of the laser can change the phase of the optical recording medium and record information through the change.

An employment of the above configuration according to the present invention can provide an optical recording medium in a high recording sensitivity and of a high reflectivity. The optical recording medium in a high reflectivity according to the present invention can be easily reproduced with an apparatus designed for a read only medium. That is, the optical recording medium according to the present invention is compatible with a reproducing only medium without any difficulty. The optical recording medium according to the present invention can record an information through a reduction reaction and does not require any change in the shape, which is required in an optical recording medium of ablative type or in an evaporation type aforementioned. A complicated structure of an air-sandwich type aforementioned is necessary for the optical recording medium in a shape changing type but is not necessary for the optical recording medium according to the present invention. This results in a simple structure and in a low cost of manufacturing for the optical recording medium according to the present invention. The present invention provides an optical recording medium having an environmental stability by using an inorganic material.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
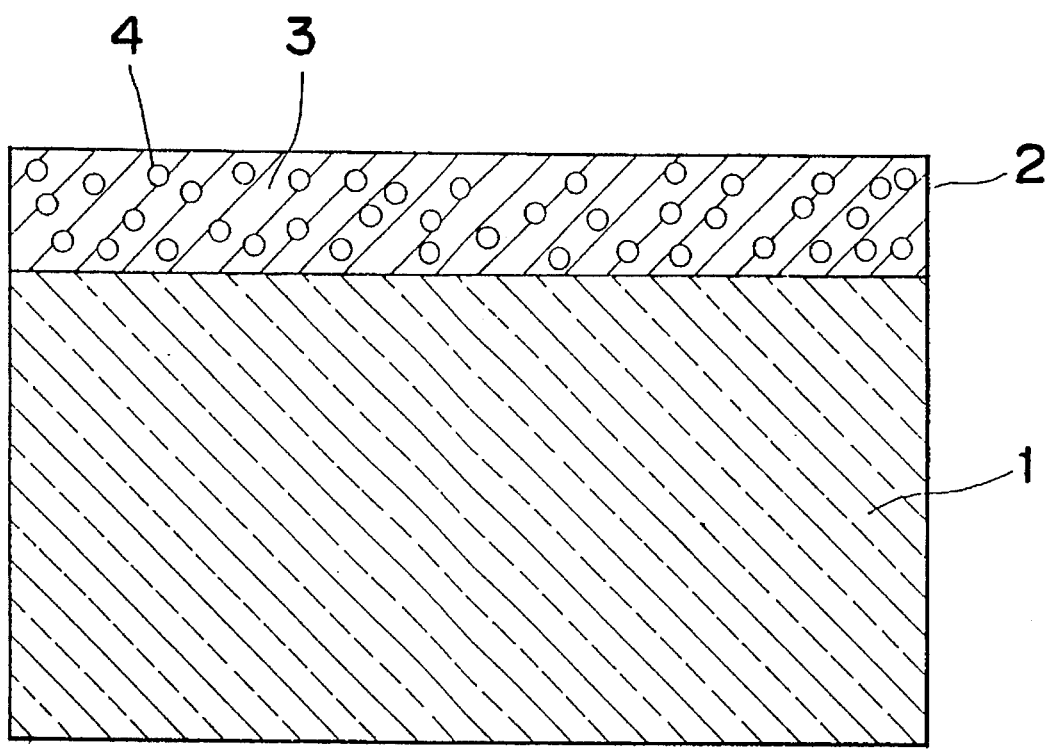
FIG. 1 shows a sectional and schematic view of an optical recording medium of an embodiment according to the present invention.

FIG. 1 shows a sectional view of the optical recording medium according to the preferred embodiment of the present invention. A substrate 1 has a flat surface and is capable of forming an optical recording film on the flat surface. The substrate 1 is preferably made of a transparent material having a low heat conductivity such as a glass or resin plate. The surface of the substrate 1 may have an uneven groove for a tracking guide. Silica glass, sodium silicate glass, boric silicate glass, polycarbonate resin, polymethyl methacrylate resin, epoxy resin or olefin resin is desirably used for the substrate 1.

An optical recording film 2 is deposited on the substrate 1. The optical recording film consists of a mixture of a metal 3 and an oxide 4.

As to the metal 3, it is important to select such a metal that the oxide thereof has a standard enthalpy of formation smaller than that of the oxide 4 used for the optical recording film 2. This means that when the mixture of the metal 3 and the oxide 4 is heated up to a predetermined temperature, the oxide 4 is reduced by the metal 3 and the mixture is changed into a mixture of a reduced metal and an oxide of the metal 3. The reduction reaction is an exothermal reaction because of the relation between two standard enthalpies of formation mentioned above.

Table 1 shows each standard enthalpy of formation of representative oxides. The metal 3 can consist of aluminum (Al), iron (Fe), or manganese (Mn). The corresponding oxides to these metals are aluminum oxide ($Al_2O_3$), iron oxide ($Fe_3O_4$), and manganese oxide ($Mn_3O_4$) which have a standard enthalpy of formation lower than −1,000 kJ/mol. The oxide 4 can consist of bismuth oxide ($Bi_2O_3$), copper oxide ($Cu_2O$), indium oxide ($In_2O_3$), molybdenum oxide ($MoO_3$), lead oxide ($Pb_2O_3$) or tellurium oxide ($TeO_2$) having a standard enthalpy of formation in a relatively high level. It is possible to make a mixture operable for the optical recording medium with any combination of an oxide and a metal, wherein the oxide has a standard enthalpy of formation in a relatively higher level than that of the corresponding oxide obtained by oxidizing the metal. It is preferable to have a combination of a metal selected from the group consisting of aluminum (Al), iron (Fe) and manganese (Mn) and an oxide selected from the group consisting of bismuth oxide ($Bi_2O_3$), copper oxide ($Cu_2O$), indium oxide ($In_2O_3$), molybdenum oxide ($MoO_3$), lead oxide ($Pb_2O_3$) and tellurium oxide ($TeO_2$). It is most preferable for the optical recording medium according to the present invention to have a combination of aluminum (Al) as a metal 3 and tellurium oxide ($TeO_2$) as an oxide 4. For example, when the combination of aluminum (Al) and tellurium oxide ($TeO_2$) is heated up to a high temperature, a reduction exothermic reaction occurs as shown in the following chemical equation. Consequently the optical constants of the recording medium change before and after this reaction.

$4 Al + 3 TeO_2 = 2 Al_2O_3 + Te$

TABLE 1

A Standard Enthalpy of Oxide
After Chemical Handbook by Maruzen
Publisher, The Revised Third Publishing.

| Oxide | Standard Enthalpy Formation (kJ/mol) |
|---|---|
| $Al_2O_3$ | −1,675.3 |
| $Bi_2O_3$ | −573.9 |
| $Cu_2O$ | −169 |
| $Fe_3O_4$ | −1,118 |
| $In_2O_3$ | −925.8 |
| $Mn_3O_4$ | −1,388 |
| $MoO_3$ | −745.1 |
| $Pb_2O_3$ | −277 |
| $TeO_2$ | −322.6 |

In this reaction, heat of about 2,350 KJ is generated. This corresponds to 19.4 J/cm$^3$. For example, if the reaction occurs at an area of diameter 1 μm on a thin film having a thickness 50 nm, heat of 0.9 nJ is generated. This amount of heat is equal to that obtained by absorbing a laser beam of 15 mW irradiated thereto for 100 nsec. with an assumed rate of absorption of 60%. This indicates that it becomes possible to record information by such a small output energy of the laser beam as mentioned above and accordingly, the sensitivity for recording is highly improved.

Complex refractive indexes of respective materials at a wavelength of 830 nm are as follows: Al 2.0+ 7.1i, $TeO_2$ 1.8+0i, Te 6.8+1.8i and $Al_2O_3$ 1.7+0i. The complex refractive index of a mixture is determined by those of components thereof.

In the above reaction, the reflectance is lowered since metalloid Te is generated in place of Al having a metallic luster.

The complex refractive index at a wavelength 830 nm of a mixture of Al and $TeO_2$ having a composition of $Al_{57}(TeO_2)_{43}$ is (1.6+1.7i) and when this mixture is completely reduced into a mixture having a composition of Te$_{60}$(Al$_2$O$_3$)$_{40}$, by subjecting it to the above reaction, that of the resultant becomes (4.3+0.9i). When Al$_{57}$(TeO$_2$)$_{43}$ thin film of 100 nm thickness is deposited on a substrate of polycarbonate having a refractive index of 1.58, the reflectance thereof is about 22% and it lowers to about 16% after completion of said reaction, namely, a change of (−7% in the reflectance is obtained. In the case that a relatively thin film is deposited so as to have a thickness of 40 nm, the reflectance varies from about 19% to about 42% (+23% gain) by the above reduction reaction. This gain is due to the interference effect by a thin film.

The complex refractive index of a mixture of Al and TeO$_2$ having a component of Al$_{90}$(TeO$_2$)$_{10}$ is (1.7+5.6i) at a wavelength of 830 nm and that of a mixture having a component of Al$_{0.82}$Te$_{0.11}$(Al$_2$O$_3$)$_{0.07}$ obtained by the above reduction reaction varies to (3.0+5.1i). When a thin film of Al$_{90}$(TeO$_2$)$_{10}$ is deposited by a thickness of 100 nm on a polycarbonate substrate having a refractive index of 1.58, the reflectance thereof is about 75% and lowers to about 60% after the reduction reaction (−15% gain). Thus, an optical recording medium having a large initial reflectance can be obtained by increasing an amount of Al to be contained therein.

Figure 2:
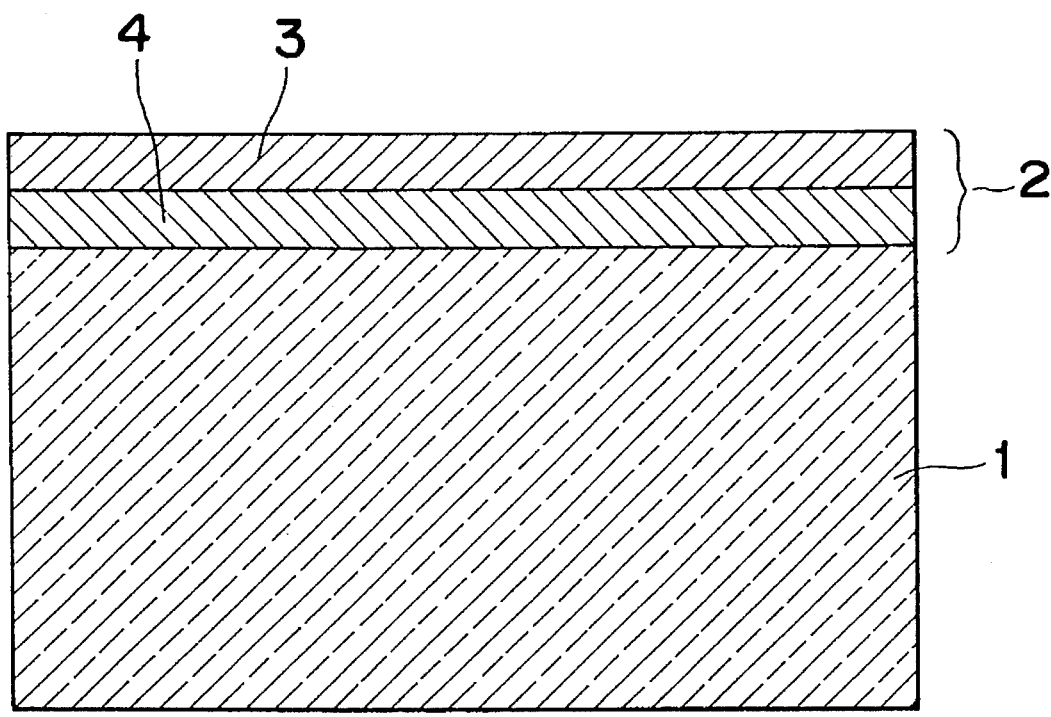
FIGS. 2 and 3 show sectional and schematic views of optical recording mediums of other embodiments according to the present invention, respectively.
Figure 3:
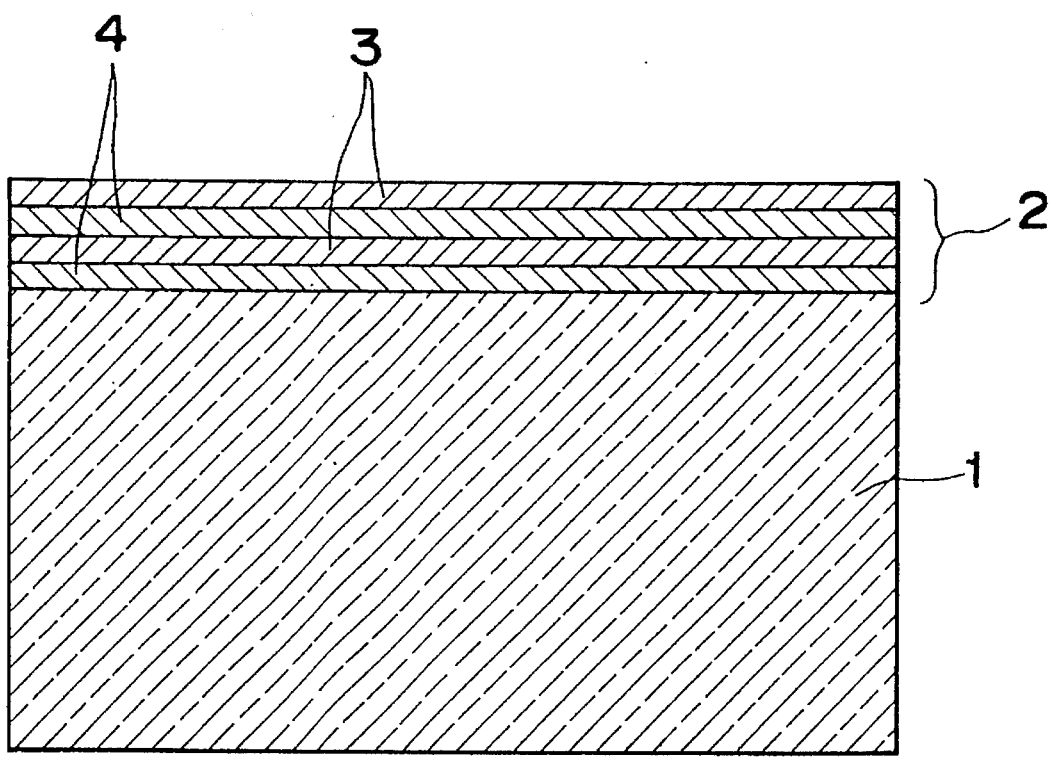

FIG. 1 shows a mixture state wherein the oxide 4 is dispersed in the metal 3. It is possible to reversely disperse the metal 3 in the oxide 4. The reduction reaction can occur when the metal and oxide are in contact with each other. When both of metal layer 3 and oxide layer 4 are in contact with each other as shown in FIG. 2, the reduction reaction can occur. In order to enlarge the contact area between the metal layer 3 and oxide layer 4, both layers can be deposited in turn to form multi-layers as shown in FIG. 3. In this case, it is arbitrary to whether to contact the metal layer 3 with the substrate 1 or to contact the oxide layer 4 with the substrate 1.

It is possible to make a mixture consisting of a plurality of kinds of metals and a plurality of oxides. In such a case, it is important that the mixture should include at least one combination of the metal and oxide which satisfies the condition related to the standard enthalpy of formation mentioned above and is capable of giving changes enough for detecting them optically before and after the reduction reaction.

For the further improvement of the optical recording medium according to the present invention in the optical efficiency and the heat control, it is possible to have a dielectric material layer and/or a metal reflecting layer formed between the substrate 1 and an optical recording film or on the optical recording film. Further, for the mechanical protection, a protecting film such as a resin film can be applied to the optical recording film with or without accompanying the dielectric material layer and/or the metal reflecting layer. These structures of the optical recording film are not shown in the drawings.

The following description will explain a method of manufacturing the optical recording medium according to the present invention. A vacuum deposition method or a sputtering method is usually employed for the formation of a metal film or an oxide film for use in an optical recording film.

However, it has been impossible to use the conventional vacuum deposition method or the conventional sputtering method wherein a single evaporation source is employed since, if it is employed in the practice of the present invention, the metal and the oxide when heated to a high temperature result in a reduction reaction therebetween. In other words, if an evaporation source of a mixture of the metal and the oxide is used for depositing the same, they cause the reduction reaction during the vacuum evaporation or sputtering, resulting in an undesirable recording film.

This problem can be solved by using plural evaporation sources, separated from each other, which are provided for the metal and the oxide, respectively. Namely, in the present invention, the metal and the oxide are vacuum-evaporated on a substrate from separated evaporation sources simultaneously.

In the case of the sputtering, the metal and the oxide are deposited from targets separated from each other. The rotation of the substrate during the vacuum deposition or the sputtering can make it possible to produce a uniform composition and the mixing state of the metal and the oxide in the optical recording film and thickness of the optical recording film according to the present invention.

When a plurality of kinds of metals and a plurality of kinds of oxides are used, the desired optical recording film can be achieved by the method mentioned above. It is possible to put a plurality of metals into one vacuum deposition source or the one sputtering source and put a plurality of oxides into one vacuum deposition source or sputtering source. Another method is to use a plurality of vacuum deposition sources or plurality of sputtering sources for the plurality of metals and plurality of oxides.

An optical recording film having a multi-layered structure as shown in FIG. 2 or FIG. 3 can be obtained by using sequentially a metal source and an oxide source separated from each other during the vacuum deposition or the sputtering. It is also preferable to rotate the substrate 1 during the execution of the vacuum deposition or the sputtering in order to produce an optical recording film having a uniform composition, mixing state and thickness.

Figure 4:
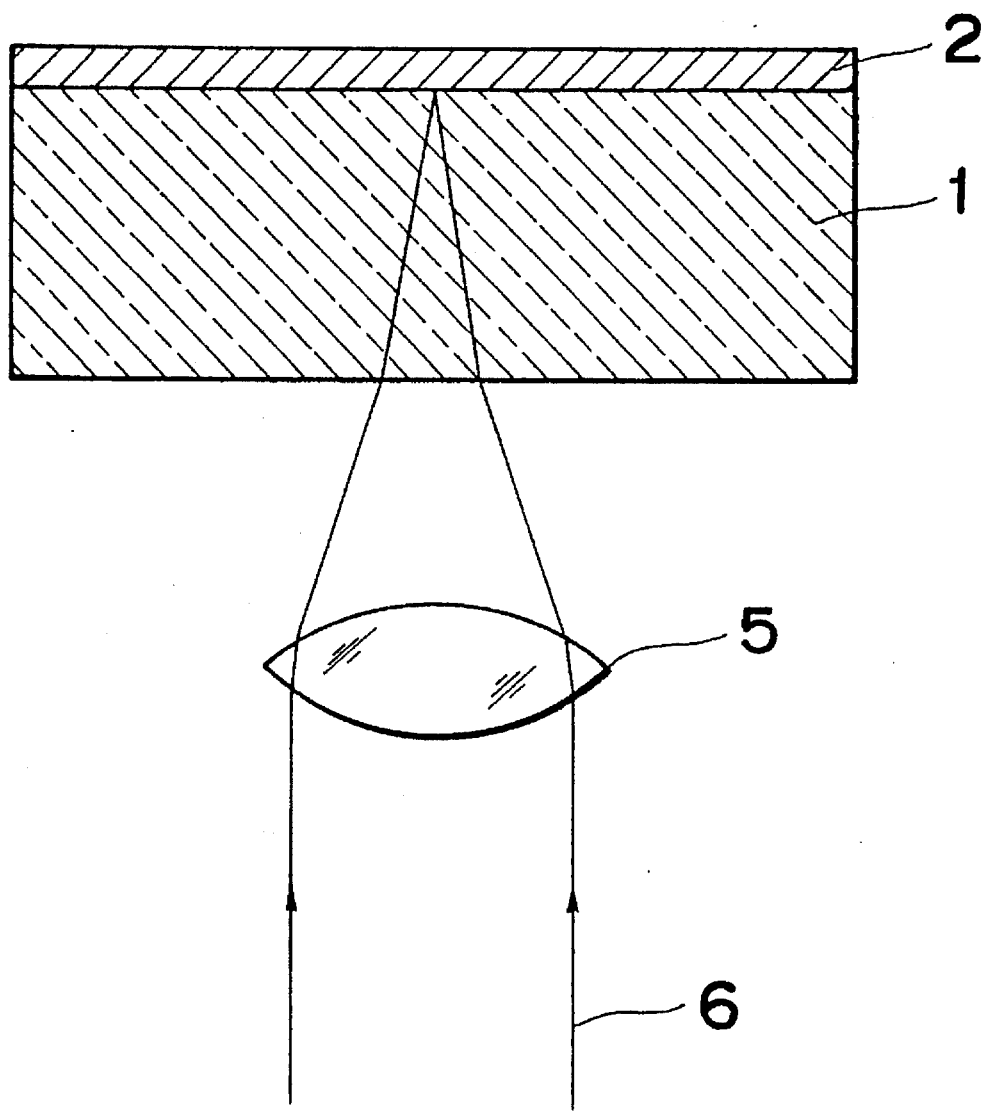
FIG. 4 shows a schematic view illustrating a method of recording an information on an optical recording medium according to the present invention.

The following description will explain a method of recording information on the optical recording medium according to the present invention. A laser beam is focused on an optical recording film through a lens as shown in FIG. 4. The laser beam having a sufficiently high output power can heat the optical recording film to a high temperature and generate a reduction reaction between the metal and the oxide contained in the optical recording film. When the laser beam having a wave length of λ is focused through a lens having an numeric aperture NA, the laser spot having a diameter of a half value width of 0.66 λ/NA is obtained. It is possible to obtain a laser spot of a diameter of about 1 μm when the laser wave length is 800 nm and the numeric aperture NA of the lens is 0.5. The obtained laser spot has a power density of 10 kW/mm$^2$ upon receiving a laser output power of 10 mW. The optical recording film is heated at the small area irradiated by such a strong laser beam to a temperature of several hundreds to one thousand degrees centigrade depending on the absorption rate and the heat constant of the optical recording film. It is clear that the metal and oxide satisfying the relation of the enthalpy of formation aforementioned are heated by the laser spot and react with each other under an exothermic reaction. Such a chain reaction accelerates the reduction reaction. It is possible to record information detectable optically on the optical recording film by irradiating the laser beam focused on the optical recording film to heat and generate a reduction reaction.

Example 1

A substrate 1 is made of a polymethyl methacrylate plate of a thickness of 1.2 mm. The vacuum deposition is carried out by an electron beam vacuum deposition apparatus having two electron beam guns. Under rotation of the substrate on a supporting holder, aluminum (Al) and tellurium oxide ($TeO_2$) are deposited on the substrate 1 by the vacuum deposition from a metal source and an oxide source separated from each other. The rotation speed is 120 rpm. The optical recording film having a given composition of aluminum and tellurium oxide can be formed by controlling the vacuum deposition rate. An optical recording film having a composition of Al of 90 mol % and $TeO_2$ of 10 mol % is formed into a thickness of 50 nm. A measurement with a laser of a wave length of 830 nm indicates that the optical recording film has a reflectance of about 70% and a beam transmittance lower than 1% and consequently has a laser absorption of about 30%. For the measurement of the resultant characteristic of the optical recording film, a laser diode of a wave length of 830 nm is irradiated through a lens having a numerical aperture NA of 0.5 and is focused on the optical recording film through a back side of the substrate 1. It is confirmed that the optical recording film changes the state by irradiation of a laser pulse of an output power of 15 mW and a pulse width of 100 ns.

The optical recording film is separated from the polymethyl-meta-acrylate substrate by dissolving the substrate with an organic solvent and is observed with an electron microscope. The electron microscope observation indicates that an aluminum oxide crystal exists at an area which is subjected to an irradiation of the laser beam. It is confirmed that tellurium oxide is reduced into tellurium metal by aluminum under irradiation of the laser beam.

Example 2

A substrate 1 is composed of a polycarbonate disk of a diameter of 120 mm and a thickness of 1.2 mm and has a guide track in a spiral form formed thereon. The guide track is of a pitch of 1.6 μm, a groove width of 0.7 μm and a groove depth of 60 nm. An optical recording film in a thickness of 50 nm is formed on the substrate 1 in a similar way to that of example 1. The mole ratio of aluminum and tellurium oxide is 90%:10%.

The optical recording film on the substrate is rotated at a liner speed of 10 m/sec and is subjected to an irradiation of a laser diode of a wave length of 830 nm. The laser diode is focused through a lens in a numerical aperture of 0.5 on the guide track under a tracking control in a conventional way. The laser diode has an output power of 13 mW at the optical recording film and is in a frequency of 5 MHz modulated at 50% modulation degree. The recorded information is reproduced by detecting a reflecting laser beam from the output laser of an output power of 1 mW with a photodetector. A reproduced signal amplitude is clearly observed through the photodetector. The optical recording medium having information recorded thereon has a sufficient reflectivity and can be reproduced compatibly with a reproducing apparatus for use in the read only medium.

Example 3

Al as a metal and $Cu_2O$ as an oxide were used. In this case, they cause an exothermal reaction of about 1170 KJ represented by the following reaction.

$$2Al+3Cu_2O \rightarrow Al_2O_3+6Cu$$

A Pyrex® glass plate of a thickness of 1.2 mm was used as a substrate. The metal Al and the oxide $Cu_2O$ are vacuum-deposited from respective evaporation sources separated from each other using an electron beam evaporation apparatus with two electron beam guns while rotating a holder of the substrate at 120 r.p.m.. A recording thin film having an arbitrary composition can be formed by controlling evaporation rates of respective evaporation sources. In this example, a thin film of a thickness of 100 nm having a composition of 40% mol concentration of Al and 60% mol concentration of $Cu_2O$ was formed. According to measurement of this sample with a laser beam of a wave length of 830 nm, the reflectivity observed from the substrate side was about 19% and the transmittance was about 9% namely the absorption coefficient was about 72%. It was confirmed that the reflectivity was increased by a change in the state when a laser beam of a wave length of 830 nm with a power of 9 mW and a pulse width of 500 ns was irradiated from the substrate side after focusing it by a lens of a numerical aperture NA of 0.5.

Example 4

Al and $In_2O_3$ were used as metal and oxide for forming a recording thin film respectively. In this case, they cause an exothermal reaction of about 750 KJ represented by the following reaction.

$$2Al+In_2O_3 \rightarrow Al_2O_3+2In$$

In this example, a thin film of a thickness of 100 nm having a composition of 67% mol concentration of Al and 35% mol concentration of $In_2O_3$ was formed. According to measurement of this sample with a laser beam of a wave length of 830 nm, the reflectivity observed from the substrate side was about 24% and the transmittance was about 5% namely, the absorption coefficient was about 71%. It was confirmed that the reflectivity was increased by irradiating laser pulses of a power of 10 mW and a pulse width of 500 ns from the substrate side after focusing the same by a lens of a numerical aperture NA of 0.5.

Example 5

Al and $Pb_2O$ were used for the metal and oxide consisting of a recording thin film. They cause an exothermal reaction of about 840 KJ represented by the following equation.

$$2Al+3Pb_2O_3 \rightarrow Al_2O_3+6Pb$$

A thin film of a thickness of 100 nm having a composition of 40% mol concentration of Al and 60% mol concentration of $Pb_2O$ was formed. According to measurement of this sample with a laser beam of a wave length of 830 nm, the reflectivity observed from the substrate side was about 35% and the transmittance was about 10% (the absorption coefficient was about 55%).

It was confirmed that the reflectivity was increased by irradiating laser pulses of a power of 10 mW and a pulse width of 500 ns from the substrate side after focusing the same by a lens of a numerical aperture of 0.5.

Example 6

Fe and $Bi_2O_3$ were used. They cause an exothermal reaction of about 1060 KJ represented by the following reaction.

$$9Fe+4Bi_2O_3 \rightarrow 3Fe_3O_4+8Bi$$

In this example, a thin film of a thickness of 100 nm having a composition of 69% mol concentration of Fe and 31% mol concentration of $Bi_2O_3$ was formed.

According to measurement of this sample with a laser beam of a wave length of 830 nm, the reflectivity was about 10% and the transmittance was 60% (the absorption coefficient was about 30%). It was confirmed that the reflectivity was relatively increased by irradiating laser pulses of a power of 15 mW and a pulse width of 500 ns from the substrate side after focusing the same by a lens of a numerical aperture of 0.5.

Example 7

Mn and $MoO_3$ were used for the metal and oxide forming a recording thin film. They cause an exothermal reaction of about 1180 KJ represented by the following equation.

$$9Mn + 4MoO_3 \rightarrow 3Mn_3O_4 + 4Mo$$

A thin film of a thickness of 100 nm having a composition of 69% mol concentration of Mn and 31% mol concentration of $MoO_3$. According to measurement of the sample with a laser beam of a wave length of 830 nm, the reflectivity observed from the substrate side was about 15% and the transmittance was about 19% and accordingly, the absorption coefficient was about 66%. It was confirmed that the reflectivity was relatively increased when a laser beam of a power of 10 mW and a pulse width of 500 nm having a wave length of 830 nm was irradiated from the substrate side after focusing the same by a lens of a numerical aperture of 0.5.

Example 8

Mn and $TeO_2$ were used. They cause an exothermal reaction of about 740 KJ represented by the following equation.

$$3Mn + 2TeO_2 \rightarrow Mn_3O_4 + 2Te$$

A thin film of a thickness of 50 nm having a composition of 60% mol concentration of Mn and 40% mol concentration of $TeO_2$ was formed. According to measurement of the sample with a laser beam of a wave length of 830 nm, the reflectivity observed from the substrate side was about 11% and the transmittance was about 48%, namely, the absorption coefficient was 41%. It was confirmed that the reflectivity was much increased by irradiating laser pulses having a power of 10 mW and a pulse width of 500 ns after focusing the same by a lens of a numerical aperture of 0.5.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing an optical recording medium having an optical recording film which is formed on a substrate and is capable of producing an optically detectable change upon irradiation with a laser beam, said method comprising the steps of:

separately preparing evaporation sources for a metal and an oxide, respectively, said oxide having a standard enthalpy of formation larger than that of an oxide of said metal, said metal and said oxide being such that, when mixed together or laminated in contact with each other and subsequently heated, result in a reduction reaction therebetween; and vacuum-depositing said metal and said oxide, supplied from said respective evaporation sources, on said substrate simultaneously or alternately to form said optical recording film without inducing the reduction reaction between the metal and the oxide during the vacuum-depositing step;

said optical recording film so formed containing the metal and the oxide in a mixed or laminated form and having a property of being susceptible to the reduction reaction, when said optical recording film is irradiated by a laser beam, to thereby induce the optically detectable change.

2. A method of manufacturing an optical recording medium according to claim 1, wherein said metal and oxide are deposited from said separated evaporation sources simultaneously.

3. A method of manufacturing an optical recording medium according to claim 1, wherein said metal and oxide are deposited from said separated evaporation sources in alternately.

4. A method for manufacturing an optical recording medium according to claim 1, wherein said substrate is rotated during the vacuum deposition.

5. A method for manufacturing an optical recording medium having an optical recording film which is formed on a substrate and is capable of producing an optically detectable change upon irradiation with a laser beam, said method comprising the steps of:

separately preparing respective targets for a metal and an oxide, said oxide having a standard enthalpy of formation larger than that of an oxide of said metal, said metal and said oxide being such that, when mixed together or laminated in contact with each other and subsequently heated, result in a reduction reaction therebetween; and sputtering said metal and said oxide, supplied from said respective targets, on said substrate simultaneously or alternately to form said optical recording film without inducing the reduction reaction between the metal and the oxide during the sputtering step;

said optical recording film so formed containing the metal and the oxide in a mixed or laminated form and having a property of being susceptible to the reduction reaction, when said optical recording film is irradiated by a laser beam, to thereby induce the optically detectable change.

6. A method for manufacturing an optical recording medium according to claim 5, wherein said metal and said oxide are deposited on said substrate from said separated targets simultaneously.

7. A method for manufacturing an optical recording medium according to claim 5, wherein said substrate is rotated during sputtering of said metal and said oxide.

8. A method for manufacturing an optical recording medium according to claim 5, wherein said metal and said oxide are deposited on said substrate from said separate targets in alternately.

* * * * *